(12) United States Patent
Chen et al.

(10) Patent No.: US 8,938,125 B2
(45) Date of Patent: Jan. 20, 2015

(54) MOTION ESTIMATION METHOD

(75) Inventors: Yen-Sung Chen, New Taipei (TW);
Tsui-Chin Chen, Hsinchu (TW); Jiande Jiang, Shaanxi Province (CN);
Yu-Tsung Hu, Changhua County (TW)

(73) Assignee: Novatek Microelectronics Corp., Hsinchu (TW)

( * ) Notice: Subject to any disclaimer, the term of this patent is extended or adjusted under 35 U.S.C. 154(b) by 191 days.

(21) Appl. No.: 13/491,618

(22) Filed: Jun. 8, 2012

(65) Prior Publication Data
US 2013/0022276 A1 Jan. 24, 2013

(30) Foreign Application Priority Data
Jul. 20, 2011 (TW) .............................. 100125608 A (51) Int. Cl.
G06K 9/36 (2006.01)
H04N 5/14 (2006.01)
H04N 7/12 (2006.01)
G06T 7/20 (2006.01)
H04N 7/01 (2006.01)

(52) U.S. Cl.
CPC .............. *G06T 7/2013* (2013.01); *H04N 7/014* (2013.01); *G06T 2207/10016* (2013.01)
USPC ....... 382/197; 382/236; 348/699; 375/240.16

(58) Field of Classification Search
CPC .............. H04N 7/00; H04N 19/00733; H04N 19/00593; H04N 19/00587; H04N 19/00151; H04N 5/144; H04N 5/145; H04N 7/014; G06T 7/0083; G06K 9/48; G06K 9/481; G06K 9/6446; G06K 9/222

USPC ......... 382/107, 236, 239, 197, 100, 232, 238;
348/699, E5.066; 375/240.16, 240.12,
375/E7.256, E7.211, E7.105, E7.25,
375/E7.107, 240.02, E7.113, E7.263;
356/27; 73/488

See application file for complete search history.

(56) References Cited

U.S. PATENT DOCUMENTS

| 6,928,116 B2 * | 8/2005 | Weon ........................ 375/240.16 |
| 7,362,808 B2 * | 4/2008 | Kang ........................ 375/240.16 |
| 8,335,258 B2 * | 12/2012 | Okumura et al. ........ 375/240.16 |

(Continued)

FOREIGN PATENT DOCUMENTS

| CN | 1925614 | 3/2007 |
| CN | 1992789 | 7/2007 |

(Continued)

OTHER PUBLICATIONS

"Office Action of Taiwan Counterpart Application", issued on Mar. 10, 2014, p. 1-p. 7, in which the listed references were cited.

(Continued)

*Primary Examiner* — Sheela Chawan
(74) *Attorney, Agent, or Firm* — Jianq Chyun IP Office (57) ABSTRACT

A motion estimation method is provided, which includes following steps: dividing a first frame to be estimated into a plurality of area units, in which each of the area units includes a plurality of blocks; and assigning a set of motion vector values to each of the area units, in which the set of motion vector values includes a plurality of predetermined motion vector values, and each of the predetermined motion vector values is assigned to at least one block in each of the area units.

14 Claims, 6 Drawing Sheets

(56) References Cited

U.S. PATENT DOCUMENTS 8,606,026 B2 * 12/2013 Ueda .............................. 382/236
2003/0142749 A1 * 7/2003 Hong ....................... 375/240.16

FOREIGN PATENT DOCUMENTS

| CN | 101288310 | 10/2008 |
|----|-----------|---------|
| CN | 101610410 | 12/2009 |
| TW | I224290 | 11/2004 |
| TW | 201114264 | 4/2011 |
| TW | 201117620 | 5/2011 |
| TW | 201125369 | 7/2011 |

OTHER PUBLICATIONS

"Office Action of China Counterpart Application", issued on Oct. 10, 2014, pp. 1-5.

* cited by examiner

(a) Grid 202 with cells labeled 400 containing numeric values 0–7.

| 0 | 1 | 2 | 3 | 4 | 5 | 6 | 7 | 5 | 1 | 6 | 7 | 3 | 1 | 5 | 7 |
|---|---|---|---|---|---|---|---|---|---|---|---|---|---|---|---|
| 4 | 5 | 2 | 3 | 5 | 6 | 7 | 3 | 4 | 0 | 2 | 3 | 0 | 0 | 3 | 6 |
| 2 | 3 | 6 | 7 | 6 | 4 | 4 | 1 | 0 | 6 | 5 | 4 | 3 | 6 | 5 | 5 |
| 6 | 7 | 0 | 5 | 7 | 5 | 5 | 6 | 3 | 2 | 7 | 7 | 2 | 2 | 1 | 4 |
| 4 | 0 | 4 | 1 | 3 | 1 | 6 | 2 | 2 | 6 | 6 | 6 | 0 | 4 | 3 | 0 |
| 5 | 1 | 6 | 2 | 5 | 3 | 5 | 4 | 5 | 4 | 1 | 7 | 4 | 2 | 7 | 4 |
| 6 | 2 | 7 | 6 | 7 | 5 | 1 | 0 | 7 | 7 | 3 | 0 | 2 | 5 | 6 | 6 |
| 7 | 3 | 5 | 0 | 3 | 1 | 3 | 6 | 1 | 3 | 6 | 4 | 0 | 4 | 2 | 5 |
| 5 | 4 | 1 | 6 | 2 | 0 | 5 | 3 | 3 | 2 | 0 | 2 | 5 | 7 | 0 | 4 |
| 1 | 0 | 5 | 4 | 7 | 4 | 4 | 2 | 0 | 6 | 2 | 6 | 3 | 5 | 6 | 2 |
| 3 | 6 | 3 | 5 | 6 | 5 | 3 | 6 | 1 | 0 | 4 | 0 | 4 | 1 | 7 | 0 |
| 7 | 7 | 4 | 1 | 7 | 6 | 7 | 7 | 5 | 4 | 6 | 4 | 6 | 5 | 4 | 1 |
| 5 | 4 | 0 | 5 | 4 | 4 | 1 | 5 | 3 | 5 | 0 | 3 | 2 | 2 | 0 | 6 |
| 1 | 5 | 2 | 1 | 6 | 5 | 5 | 1 | 2 | 3 | 4 | 7 | 6 | 3 | 7 | 2 |
| 3 | 7 | 6 | 7 | 2 | 6 | 2 | 7 | 3 | 4 | 0 | 5 | 2 | 5 | 3 | 4 |
| 2 | 6 | 2 | 3 | 1 | 7 | 3 | 3 | 6 | 5 | 1 | 1 | 3 | 1 | 5 | 0 |

(b) vector information represented by each figure

| 0: ← |
| 1: → |
| 2: ↓ |
| 3: ↑ |
| 4: ↙ |
| 5: ↗ |
| 6: ↘ |
| 7: ↖ |

MOTION ESTIMATION METHOD

CROSS-REFERENCE TO RELATED APPLICATION

This application claims the priority benefit of Taiwan application ser. no. 100125608, filed on Jul. 20, 2011. The entirety of the above-mentioned patent application is hereby incorporated by reference herein and made a part of this specification.

BACKGROUND OF THE INVENTION

1. Field of the Invention

The invention generally relates to an image processing method, and more particularly, to a motion estimation method of dynamical images.

2. Description of Related Art

In an image processing course, every frame in a video image is divided into a plurality of macroblocks (MBs) and a whole compression program is broken up into a plurality of stages, in which each stage is in charge of processing a different compression program, for example, motion estimation and motion compensation program (MEMC), discrete cosine transform program (DCT program), variable length coding program (VLC program) and reconstruction program.

In a motion estimation course, the positions of the MBs of a motion object on a frame to be estimated are predicted according to the reference blocks of the motion object in the successive frames in association with newly-generated motion vectors, in which the motion amplitudes and motion directions of the MBs and the reference blocks are motion vectors.

In the prior art, during generating new motion vectors, the new motion vectors are often generated in stochastic refreshing way, which provides a random number sequence for output. The advantage of the above-mentioned scheme rests in easier implementation, but the disadvantage thereof rests in that in a same MB, different motion vectors are often unable to fast get their turns. In addition, when a motion object of an area in a frame instantaneously changes its motion path, the algorithm of motion estimation needs to fast converge; however, the conventional stochastic refreshing way for generation new motion vectors often fails to make the motion object fast converge to an accurate vector.

In this regard, it is necessary to provide a motion estimation method with faster convergence speed.

SUMMARY OF THE INVENTION

Accordingly, a motion estimation method is provided, which is able to allow a motion object to fast converge to an accurate vector.

According to an aspect, a motion estimation method is provided, which includes following steps: dividing a first frame to be estimated into a plurality of area units, in which each of the area units includes a plurality of blocks; and assigning a set of motion vector values to each of the area units, in which the set of motion vector values includes a plurality of predetermined motion vector values, and each of the predetermined motion vector values is assigned to at least one block in each of the area units.

In an embodiment of the invention, the predetermined motion vector values assigned to any two adjacent blocks in each of the area units are different from each other.

In an embodiment of the invention, each of the area units has a variable or fixed total number of blocks.

In an embodiment of the invention, the above-mentioned motion estimation method further includes providing a lookup table (LUT) for recording the predetermined motion vector values assigned respectively to the blocks of each area unit of the first frame to be estimated.

In an embodiment of the invention, the above-mentioned motion estimation method further includes generating a plurality of motion vectors respectively corresponding to the blocks of each of the area units of the first frame to be estimated referring to the lookup table.

In an embodiment of the invention, each of the area units of the above-mentioned first frame to be estimated has one sub-area or multiple sub-areas, each of the sub-areas includes one block or multiple blocks, and the one block or the multiple blocks of two corresponding sub-areas in any two area units are respectively assigned the same predetermined motion vector values with a rotation mapping relationship.

In an embodiment of the invention, the above-mentioned step of assigning the set of predetermined motion vector values to each of the area units includes following steps: providing a seed area unit, which includes a plurality of blocks to which the predetermined motion vector values are respectively assigned; and respectively assigning the predetermined motion vector values to the respective blocks of each of the area units based on an assignation pattern of the seed area unit.

In an embodiment of the invention, the above-mentioned step of respectively assigning the predetermined motion vector values to the respective blocks of each of the area units based on the seed area unit includes following steps: dividing the seed area unit into one first sub-area or multiple first sub-areas, in which each of the first sub-areas includes one block or multiple blocks; dividing each of the area units into one second sub-area or multiple second sub-areas, in which each of the second sub-areas includes one block or multiple blocks, the one block or the multiple blocks of each of the second sub-areas are corresponding to the one block or the multiple blocks of each of the one first sub-area or the multiple first sub-areas; and respectively deciding the assignation pattern for the corresponding one second sub-area or the corresponding multiple second sub-areas in each of the area units based on the respective assignation pattern of the one first sub-area or the multiple first sub-areas.

In an embodiment of the invention, the respective one block or multiple blocks of the above-mentioned one first sub-area or the respective multiple first sub-areas and the respective one block or the respective multiple blocks of the one second sub-area or multiple second sub-areas in each of the area unit are respectively assigned the same predetermined motion vector values with a rotation mapping relationship.

In an embodiment of the invention, the above-mentioned motion estimation method further includes a following step: respectively assigning the predetermined motion vector values to the corresponding area unit in a second frame to be estimated based on the respective assignation pattern of each of the area units in the first frame to be estimated.

In an embodiment of the invention, the blocks of each of the area units of the above-mentioned first frame to be estimated and the blocks of each of the area units of the second frame to be estimated are assigned the same predetermined motion vector values with a rotation mapping relationship.

According to another aspect, a motion estimation method is provided, comprising: dividing a first frame to be estimated into a plurality of area units, wherein each of the area units comprises a plurality of blocks; providing a seed area unit, comprising a plurality of blocks to which a plurality of predetermined motion vector values are respectively assigned; respectively assigning the predetermined motion vector values to the respective blocks of each of the area units based on an assignation pattern of the seed area unit, wherein each of the predetermined motion vector values is assigned to at least one block in each of the area units, and the predetermined motion vector values assigned to any two adjacent blocks in each of the area units are different from each other.

Based on the depiction above, in the exemplary embodiments of the invention, the motion estimation method can assure adjacent blocks in a frame to be estimated corresponding to different motion vectors and shorten the required time for the motion object to converge at the accurate vector during performing a motion estimation.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The First Embodiment

In order to advance the frame quality of video images, the refreshing rate of the current panel television has been increased, for example, from 60 Hz increased to 120 Hz. The refreshing rate is increased based on the principle of motion estimation technique, in which a frame to be estimated is added between two reference frames to increase the refreshing rate of a panel television from 60 Hz to 120 Hz. In this way, the video image would be sharper and clearer so as to eliminate ghost shadows and increase dynamical clarity.

Figure 1:
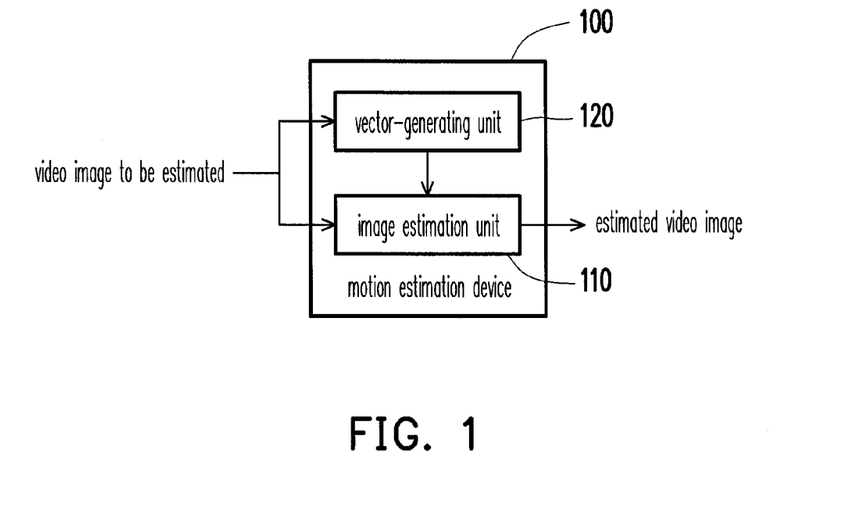
FIG. 1 is a function block chart of a motion estimation device according to the first embodiment of the invention.
Figure 2:
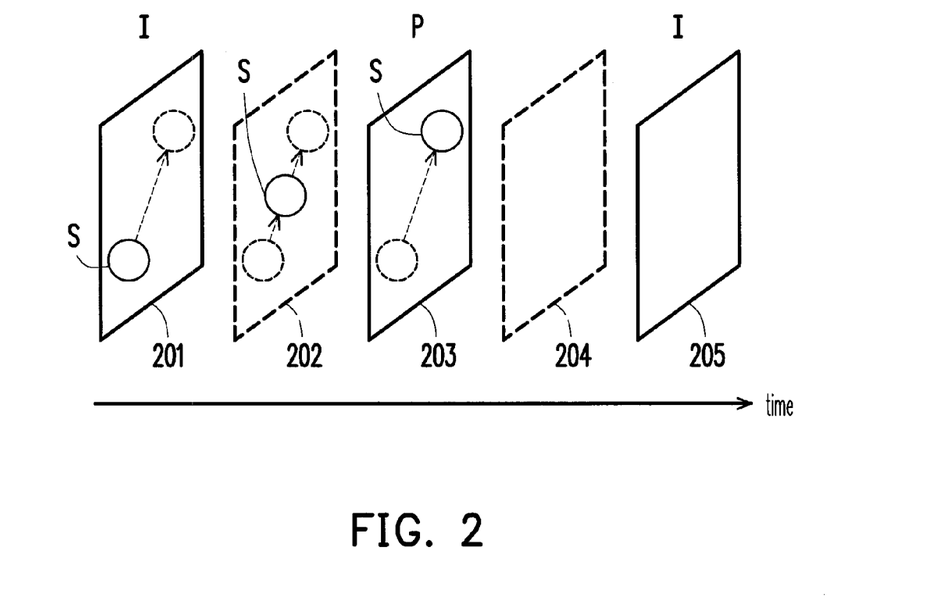
FIG. 2 is a schematic diagram showing a video image processed by the motion estimation device of FIG. 1.

FIG. 1 is a function block chart of a motion estimation device according to the first embodiment of the invention and FIG. 2 is a schematic diagram showing a video image processed by the motion estimation device of FIG. 1. Referring to FIGS. 1 and 2, in the embodiment, a motion estimation device 100 is suitable for estimating the image information of a motion object in a video image. The video image processed by the motion estimation device 100 includes a plurality of image frames 201-205. In the video image, when a motion object of an area in a frame changes the motion path thereof, the motion estimation device 100 is required to perform a motion estimation on the motion object and makes the motion object fast converge. For example, in FIG. 2, a motion object S moves from the lower-left corner to the upper-right corner of the video image, the motion estimation device 100 performs a motion estimation on the frame to be estimated 202 between two reference frames 201 and 203 so as to predict the position of the motion object S in the frame to be estimated 202. The image frame 201 herein is, for example, an intra-coding frame (I frame) and the image frame 203 is, for example, a prediction frame (P frame), which the invention is not limited to.

In more details, in the embodiment, the motion estimation device 100 includes an image estimation unit 110 and a vector-generating unit 120. Once the motion estimation device 100 receives a video image, the image estimation unit 110 immediately performs a motion estimation on the video image, in which the image estimation unit 110 performs the motion estimation on the motion object S of the frame to be estimated 202 according to, for example, the image information of the reference blocks in the reference frames 201 and 203 and a motion vector provided by the vector-generating unit 120.

Figure 3:
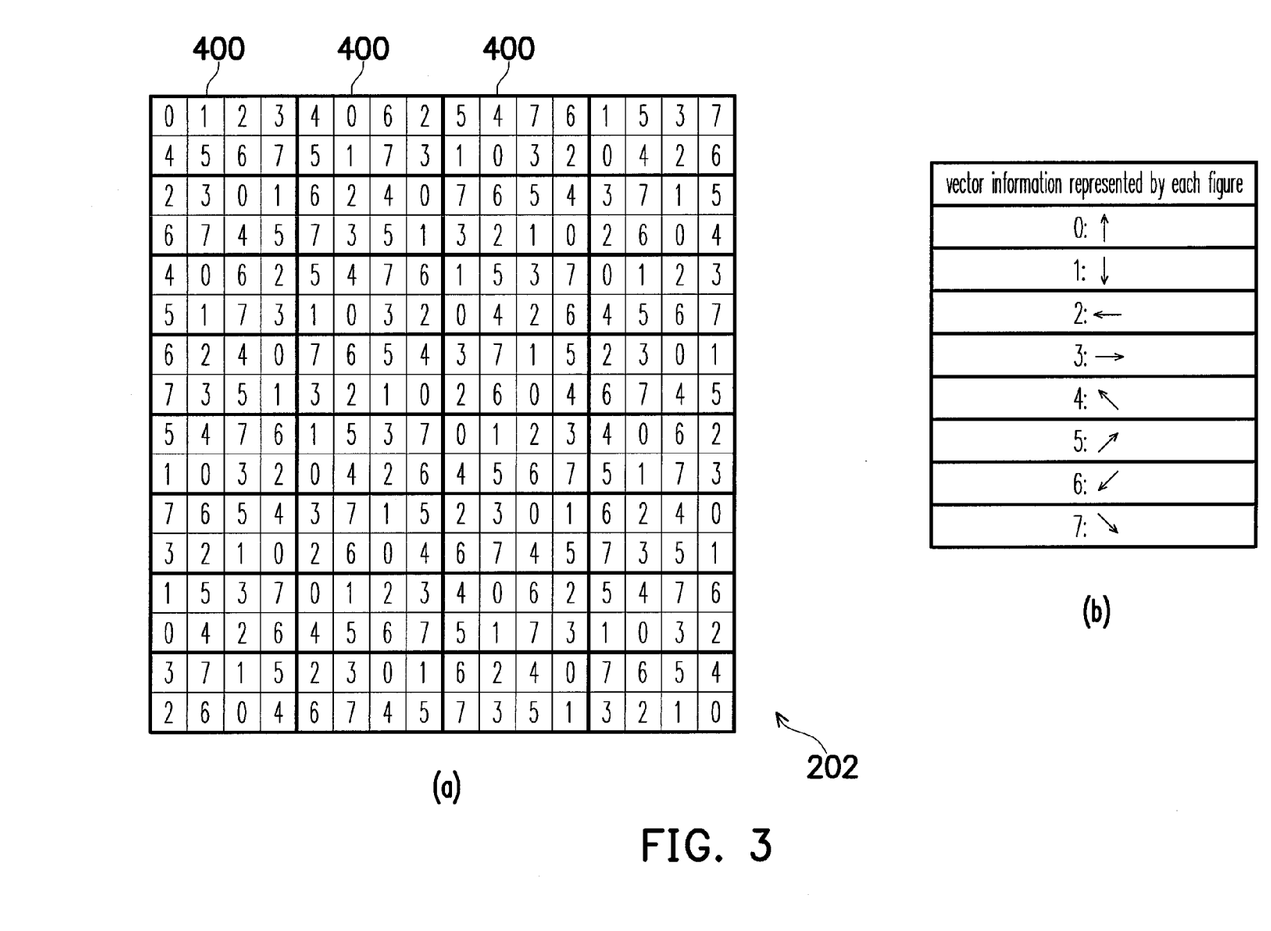
FIG. 3(a) is a schematic diagram showing a frame to be estimated according to an embodiment of the invention.
FIG. 3(b) indicates the vector information represented by all figures of the motion vector values in FIG. 3(a).

FIG. 3(a) is a schematic diagram showing a frame to be estimated according to an embodiment of the invention and FIG. 3(b) indicates the vector information represented by all figures of the motion vector values in FIG. 3(a). Referring to FIGS. 3(a) and 3(b), in the embodiment, the vector-generating unit 120 divides the frame to be estimated 202 into a plurality of area units 400 and each of the area units includes a plurality of blocks. In FIGS. 3(a) and 3(b), the frame to be estimated 202 is divided, for example, into 32 area units 400 and each of the area units includes 8 blocks.

After that, the vector-generating unit 120 assigns a set of motion vector values to every area unit. In the embodiment, the set of motion vector values includes a plurality of predetermined motion vector values, for example, from '0' to '7', in which the marked figure of each block represents a motion vector value assigned to the block. One unique feature of the embodiment rests in that the vector-generating unit 120 assigns every one among the predetermined motion vector values to at least one block in each of the area units. In other words, in any area unit, every one of the predetermined motion values from '0' to '7' is assigned to one block or multiple blocks, and there is no one in the predetermined motion values unassigned. Taking FIG. 3(a) as an example, in the lower-left corner area unit 400, a set of motion vector values including 8 figures from '0' to '7' are one to one assigned to every block in the area unit 400, and they are analogically assigned to each of the rest area units 400 except at different positions.

Preferably, in each of the area units, any two adjacent blocks are assigned with different predetermined motion vector values. That is to say, two adjacent blocks are corresponding to different motion vectors. Such assignation way is helpful for further shortening the time for a motion object to converge to an accurate vector. In the following, FIGS. 4(a)-4(C) are used to explain the assignation way of motion vector values for a frame to be estimated according to an exemplary embodiment.

FIG. 3(b) indicates the vector information represented by all figures of the motion vector values in FIG. 3(a), which the invention is not limited to. For example, '0' represents the motion direction to be estimated of the motion object at the corresponding block to be estimated is upwards, '7' represents the motion direction to be estimated of the motion object at the corresponding block to be estimated is right downwards, and analogically for the rest. In other embodiments, the vector information represented by each figure may further include the amplitude of a motion vector in addition to the direction of the motion vector.

Then, the vector-generating unit 120 provides a lookup table (LUT) for recording the predetermined motion vector values assigned respectively to the blocks of each area unit of the frame to be estimated 202. The values recorded by the LUT provided by the vector-generating unit 120 herein are, for example, the assignation result shown by FIG. 3(a). Further, the vector-generating unit 120 can refer to the LUT to generate respective motion vectors of the blocks of each area unit in the frame to be estimated 200.

In summary, by assigning every one of the predetermined motion vector values to at least one block in each area unit, the embodiment can assure generating motion vectors with different directions in a fixed area or a variable area, which avoids the conventional result that motion vectors with some of directions are unable to get their turns to be assigned. In comparison with the prior art, the embodiment can largely shorten the time for convergence to accurate vectors. In addition, in each area unit, two adjacent blocks can receive different assigned motion vector values so as to further shorten the converging time.

It should be noted that in the embodiment, each area unit has a total block number of 8, which the invention is not limited to. In other embodiments, each area unit can have a variable total block number.

In the embodiment, the blocks of the frame to be estimated 202 are square blocks for explanation, and the frame has, for example, square blocks of 16 columns×16 rows, i.e., each column or each row has 16 blocks, which the invention is not limited to. In other embodiments, the column number and row number of the blocks or the shape or the area of each block can be changed depending on the design requirement. In the embodiment, each block includes, for example, 4×4 pixels, which the invention is not limited to. In other embodiments, each block can include different pixel numbers.

Figure 4:
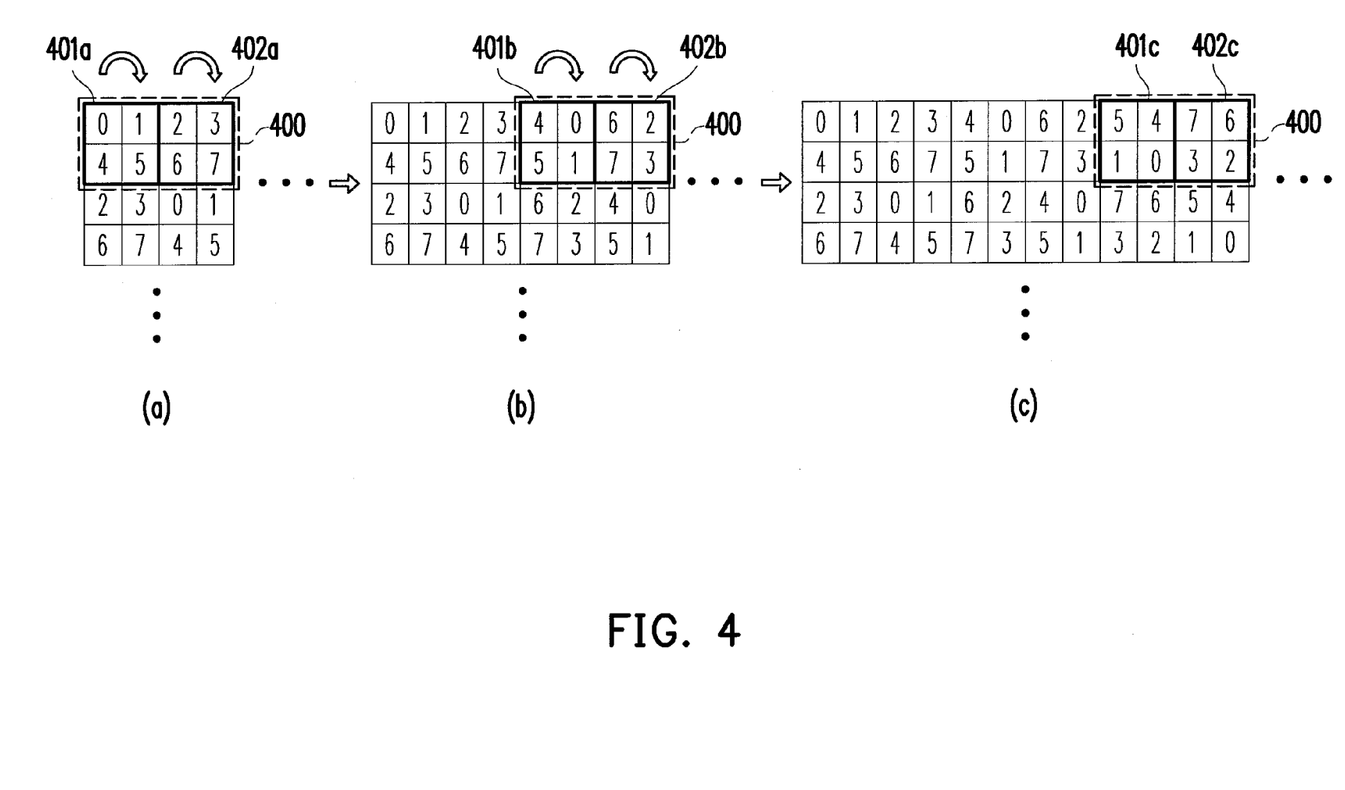
FIGS. 4(a)-4(c) are schematic diagrams showing the assignation way of motion vector values to a frame to be estimated according to an embodiment of the invention.

FIGS. 4(a)-4(c) are schematic diagrams showing the assignation way of motion vector values to a frame to be estimated according to an embodiment of the invention. Referring FIGS. 3(a)-4(c), in the embodiment, each area unit of a frame to be estimated 200 has one sub-area or multiple sub-areas and each of the sub-areas respectively includes one block or multiple blocks.

In more details, taking FIGS. 4(a)-4(c) as example, an area unit 400 with blocks of two rows in the frame to be estimated 200 of FIG. 3(a) is shown, where the area units 400, from left to right, respectively include two sub-areas 401a and 402a, two sub-areas 401b and 402b and two sub-areas 401c and 402c. In the embodiment, each of the sub-areas respectively includes 4 blocks, which the invention is not limited to and it can be easily in analogical way deducted to other total block numbers, and in some embodiments, even the total block numbers of different sub-areas in each area unit can be different from each other.

As shown by FIGS. 4(a)-4(c), all the sub-areas 401a, 401b and 401c include the same predetermined motion vector values '4', '0', '1' and '5', but the predetermined motion vector values are located at different positions in different sub-areas. In the embodiment, the positions of the predetermined motion vector values in different sub-areas have a rotation mapping relationship therebetween. In more details, the sub-area 401b is obtained from the sub-area 401a by taking a clockwise rotation mapping; the sub-area 401c is obtained from the sub-area 401b by taking a clockwise rotation mapping. Similarly, the sub-areas 402a, 402b and 402c include the same predetermined motion vector values '7', '6', '2' and '3', but the predetermined motion vector values are located at different positions in different sub-areas and have a similar rotation mapping relationship.

In an embodiment, the vector-generating unit 120 can provide a seed area unit before assigning predetermined motion vector values to each of the area units. After that, the vector-generating unit 120 respectively assigns the predetermined motion vector values to the blocks of each of the area units based on an assignation pattern of the seed area unit.

Further, in order to achieve the assignation pattern of FIG. 3(a), the vector-generating unit 120 can firstly provide, for example, the area unit 400 of FIG. 4(a) serving as the seed area unit, and the seed area unit then is divided into at least one sub-area, for example, two first sub-areas 401a and 402a. Each of the first sub-areas respectively includes 4 blocks and the 4 blocks are assigned with 4 different predetermined motion vector values. In other embodiments, the seed area units 400 can have other assignation patterns as long as each of the predetermined motion vector values is assigned to at least one block in the seed area units 400. In addition, in the seed area units 400, the predetermined motion vector values of any two adjacent blocks are preferably different from each other.

Then, the vector-generating unit 120 divides the area unit 400 of FIG. 4(b) into two second sub-areas 401b and 402b and each of the second sub-areas respectively includes 4 blocks, in which the blocks of each of the second sub-areas are corresponding to the blocks of each of the first sub-areas. For example, the second sub-area 401b includes an upper-left block, a down-left block, a down-right block and an upper-right block, which are respectively corresponding to the upper-left block, the down-left block, the down-right block and the upper-right block of the first sub-area 401 a. Similarly, the second sub-area 402b includes an upper-left block, a down-left block, a down-right block and an upper-right block, which are respectively corresponding to the upper-left block, the down-left block, the down-right block and the upper-right block of the first sub-area 402a.

After that, the vector-generating unit 120 respectively deciding assignation patterns for the corresponding second sub-areas 401b and 402b based on the respective assignation patterns of the first sub-areas 401a and 402a. In the embodiment, the vector-generating unit 120 assigns the same predetermined motion vector values to different sub-areas according to a rotation mapping relationship. As a result, the assignation pattern of the second sub-area 401b is obtained from the assignation pattern of the first sub-area 401a with a clockwise rotation mapping relationship, and the same predetermined motion vector values '4', '0', '1' and '5' are assigned at different positions. Similarly, the assignation pattern of the second sub-area 402b is obtained from the assignation pattern of the first sub-area 402a with a clockwise rotation mapping relationship, and the same predetermined motion vector values '6', '2', '3' and '7' are assigned at different positions. The invention does not limit the above-mentioned assignation way. The vector-generating unit 120 can take any assignation way to respectively decide assignation patterns for the corresponding second sub-areas in each area unit based on the respective assignation patterns of the first sub-areas.

Although FIGS. 4(a)-4(c) illustrate the method of generating the motion vector values of the first to fourth rows of the frame to be estimated 202, but the above-mentioned assignation method of FIGS. 4(a) and 4(b) can be analogically deducted to generate the vector values for sub-areas of the rest area units in the frame to be estimated 202, which is omitted to describe. In this way, the vector-generating unit 120 continuously repeats the above-mentioned method to obtain the assignation results as the frame to be estimated 202 of FIG. 3(a).

In short, in the embodiment, when the vector-generating unit 120 respectively assigns the predetermined motion vector values to the blocks of each of the area units based on an assignation pattern of the seed area unit, the seed area unit is divided into a plurality of first sub-areas, wherein each of the area unit except the seed area unit is divided into a plurality of second sub-areas, and the blocks of each of the second sub-areas are corresponding to the blocks of the first sub-area. Then, the vector-generating unit 120 respectively decides assignation patterns for the corresponding second sub-areas in each area unit based on the respective assignation patterns of the first sub-areas. Since the assignation pattern of the seed area unit 400 meets the condition that every one of the predetermined motion vector values is assigned to at least one block in the seed area unit 400, the other area units 400 generated with the above-mentioned method can also meet the above-mentioned same condition. As a result, it can assure generating motion vectors with all different directions in a fixed area or a variable area, which largely shortens the time for converging at the accurate vector. It should be noted that although each sub-area herein includes two sub-areas and the assignation way thereof is explained, the above-mentioned way can be easily analogically deducted to the area units respectively with other sub-area numbers for assignation.

According to the above-mentioned assignation way, one block or multiple blocks of the corresponding sub-areas in any two area units are respectively assigned the same predetermined motion vector values with a rotation mapping relationship. It should be noted that the above-mentioned clockwise rotation mapping relationship presented between the corresponding sub-areas in any two area units is an exemplary case only, which the invention is not limited to. In other embodiments, the rotation mapping relationship can be an anticlockwise rotation mapping or any other mapping relationships (for example, translation mapping, reflection mapping, etc.) or a combination thereof. However, no matter which mapping relationship an assignation result is generated with, any adjacent blocks in a frame to be estimated are preferably assigned with different assigned motion vector values so as to assure any adjacent blocks in the blocks to be estimated have different corresponding motion vectors.

Figure 5:
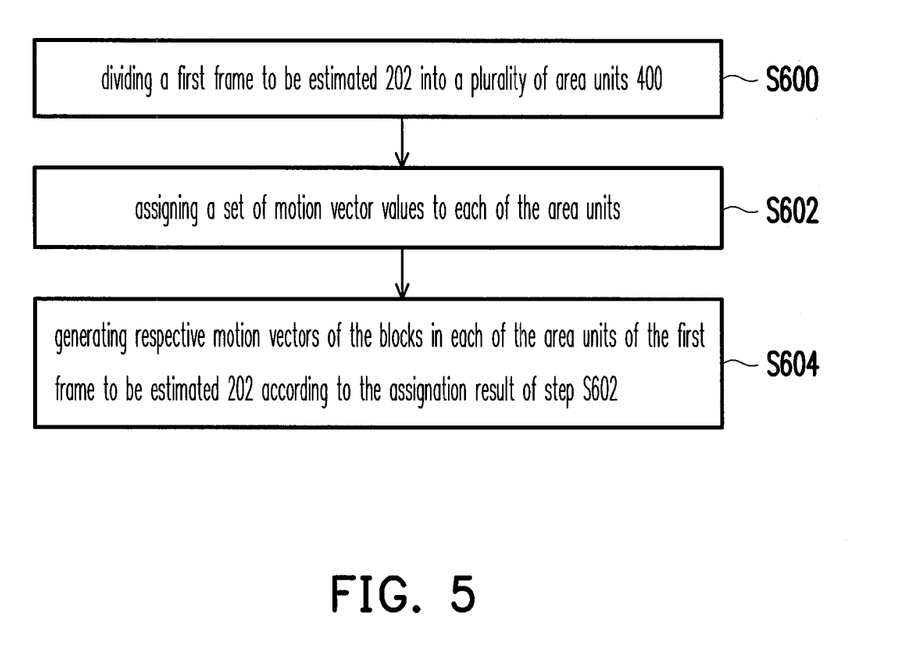
FIG. 5 is a step flowchart of a motion estimation method according to the first embodiment of the invention.

FIG. 5 is a step flowchart of a motion estimation method according to the first embodiment of the invention. Referring FIGS. 1-5, the motion estimation method of the embodiment includes following steps.

First in step S600, a first frame to be estimated 202 is divided into a plurality of area units 400, in which each of the area units includes a plurality of blocks. Next in step S602, a set of motion vector values is assigned to each of the area units. Then in step S604, respective motion vectors of the blocks in each of the area units of the first frame to be estimated 202 are generated according to the assignation result of step S602.

It should be noted that in step S602, the motion vector values include a plurality of predetermined motion vector values and every one of the predetermined motion vector values is assigned to at least one block in each area unit. In addition, in each of the area units, any two adjacent blocks are preferably assigned with different predetermined motion vector values. The rest more details about the motion estimation method of the first embodiment can refer to the enough instructions, suggestions and the implementation depictions in the above-mentioned exemplary embodiment of FIGS. 1-5.

The Second Embodiment

In addition to increasing the refreshing rate of a current panel television from 60 Hz increased to 120 Hz, the refreshing rate can be further increased to 240 Hz. At the time, at least one frame to be estimated must be added between two reference frames to increase the quality of video images.

In the first embodiment, one frame to be estimated is added between two reference frames with the motion estimation method, while in the second embodiment, two frames to be estimated are added between two reference frames.

Figure 6:
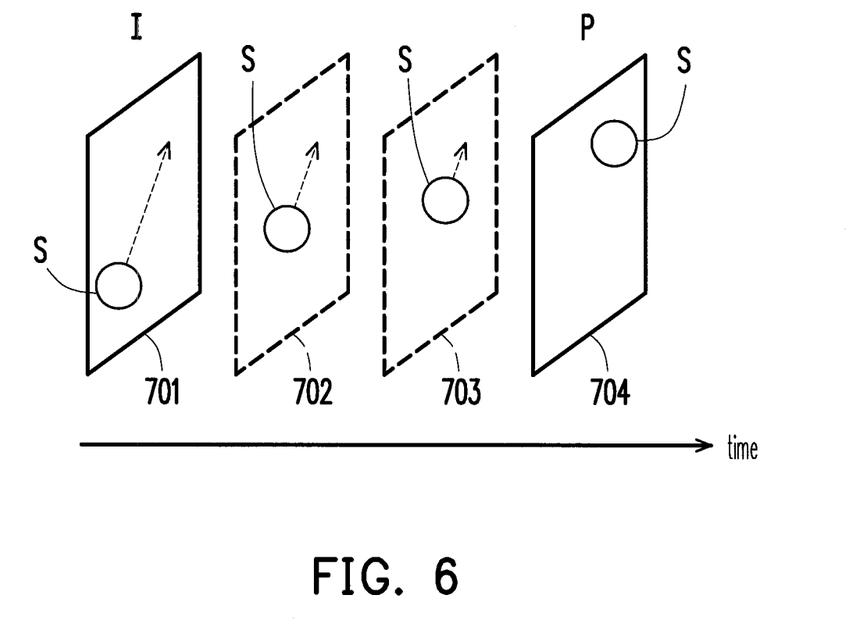
FIG. 6 is a schematic diagram showing a video image processed by the motion estimation device of FIG. 1 according to the second embodiment of the invention.

FIG. 6 is a schematic diagram showing a video image processed by the motion estimation device of FIG. 1 according to the second embodiment of the invention. Referring to FIGS. 1 and 6, in the embodiment, a video image includes two reference frames 701 and 704 and two frames to be estimated 702 and 703.

Figure 7:
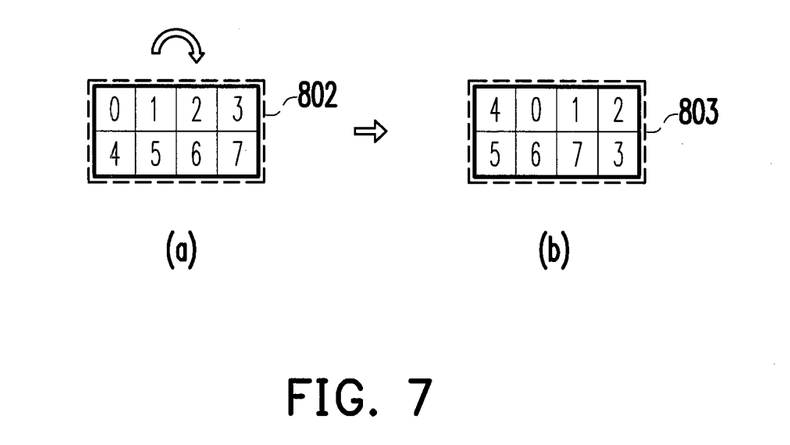
FIG. 7(a) is a schematic diagram showing one of the area units of the first frame to be estimated.
FIG. 7(b) is a schematic diagram showing area units of the second frame to be estimated corresponding to the first frame to be estimated.

First, the image estimation unit 110 performs a motion estimation on the frame to be estimated 702 according to, for example, the image information of the reference frames 701 and 704 and the motion vectors provided by the vector-generating unit 120. The adopted motion estimation method herein is, for example, the method of the first embodiment. In other words, the vector-generating unit 120 can produce the respective assignation pattern of each of the area units in the first frame to be estimated 702 according to the respective assignation pattern of each of the area units in the first frame to be estimated 202 in the first embodiment. FIG. 7(a) is a schematic diagram showing an area unit 802 of the first frame to be estimated 702.

Then, the image estimation unit 110 performs a motion estimation on the frame to be estimated 703 according to the image information of the reference frames 701 and 704 and the motion vectors with different assignation patterns provided by the vector-generating unit 120, and the adopted motion estimation method is the same as the first embodiment. Preferably, when the image estimation unit 110 performs a motion estimation on the frame to be estimated 703, the vector-generating unit 120 can respectively decide assignation patterns for the second frames to be estimated 703 based on the respective assignation patterns of each area unit in the frame to be estimated 702.

In more details, the vector-generating unit 120 can respectively assign the predetermined motion vector values to the corresponding area units in the second frame to be estimated 703 based on the respective assignation pattern of each of the area units in the first frame to be estimated 702. FIG. 7(b) is a schematic diagram showing two area units 802 and 803 of the second frame to be estimated 703 corresponding to the first frame to be estimated 702.

In a preferable embodiment, both the blocks of the area unit 802 in the first frame to be estimated 702 and the blocks of the corresponding area unit 803 in the second frame to be estimated 703 are assigned with the same predetermined motion vector values in a clockwise rotation mapping relationship therebetween. Similarly, in addition to the area units 802 and 803, both the blocks of other every area unit in the first frame to be estimated 702 and the blocks of other every corresponding area unit in the second frame to be estimated 703 can be also assigned with the same predetermined motion vector values in a same rotation mapping relationship therebetween.

By using the above-mentioned assignation way, there is a rotation mapping relationship between the assignation pattern of the frame to be estimated 702 and the assignation pattern of the second frame to be estimated 703, so that the predetermined motion vector values respectively assigned to the corresponding blocks in the second frame to be estimated 703 and the blocks in the first frame to be estimated 702 are different from each other, which can avoid the image estimation unit 110 performs two motion estimations respectively on the blocks of the first frame to be estimated 702 and the corresponding blocks of the second frame to be estimated 703 by using same motion vectors, and thereby, the converging speed in the embodiment would be not affected.

It should be noted that the invention does not limit assignation to the clockwise rotation mapping relationship. In other embodiments, the vector-generating unit 120 can use any way, for example, by using various mapping relationships (for example, translation or reflection) or other combinations to assign the predetermined motion vector values respectively to the corresponding area units in the second frame to be estimated 703 based on the respective assignation patterns of each of the area units in the first frame to be estimated 702. Preferably, the above-mentioned operations need to meet the condition that the blocks in the frame to be estimated 703 corresponding to the blocks with same positions in the frames to be estimated 702 have different motion vectors from the vectors of 702.

In addition, as depiction above, any two adjacent blocks in each of the area units of the first frame to be estimated 702 are assigned preferably with different predetermined motion vector values. By using the above-mentioned assignation way, the predetermined motion vector values are assigned respectively to the corresponding area units in the second frame to be estimated 703 based on the respective assignation patterns of each of the area units in the first frame to be estimated 702, so that the assignation result must be that the predetermined motion vector values assigned to any two adjacent blocks in every area unit of the second frame to be estimated 703 are different from each other.

Figure 8:
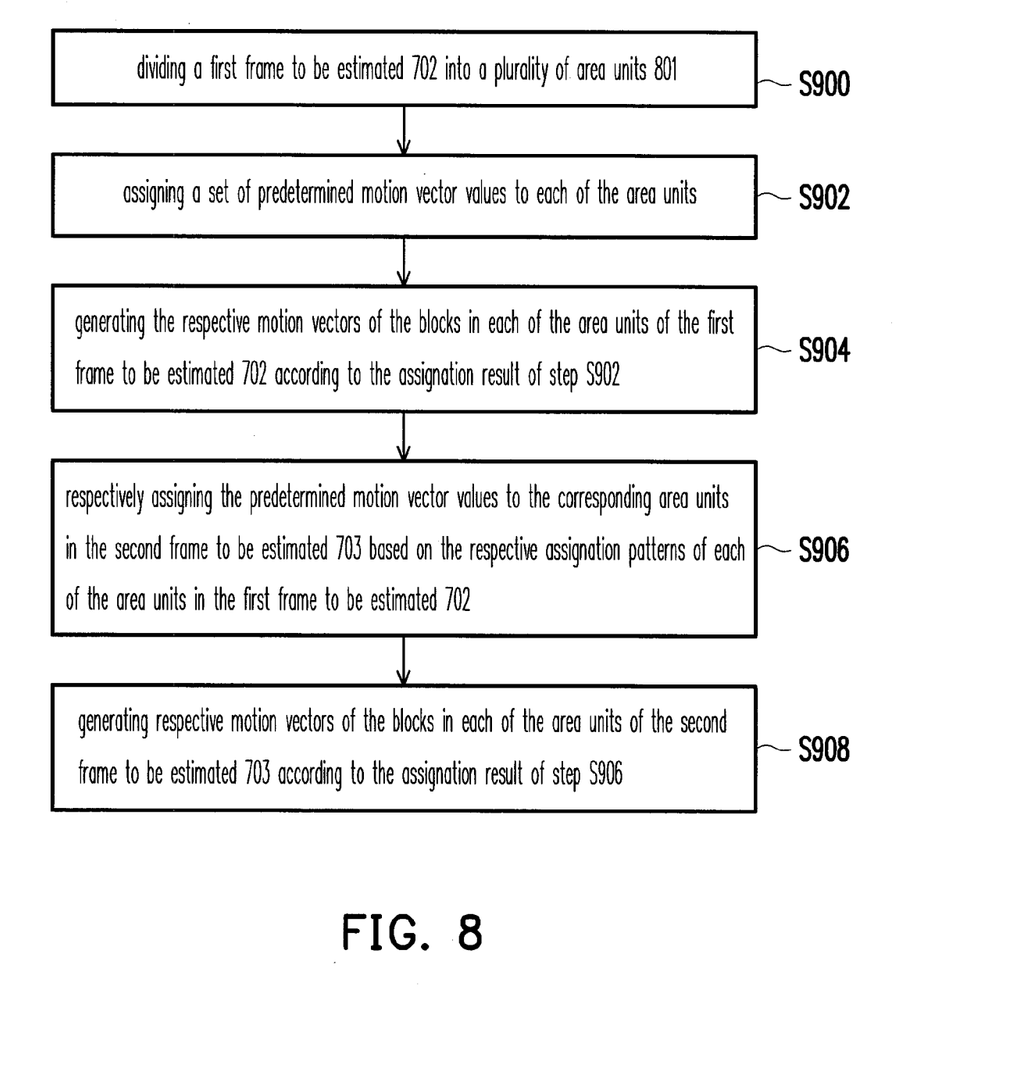
FIG. 8 is a step flowchart of a motion estimation method according to the second embodiment of the invention.

FIG. 8 is a step flowchart of a motion estimation method according to the second embodiment of the invention. Referring to FIGS. 1-8, the motion estimation method of the embodiment includes following steps.

First in step S900, a first frame to be estimated 702 is divided into a plurality of area units 801, in which each of the area units includes a plurality of blocks. Next in step S902, a set of predetermined motion vector values are assigned to each of the area units. Then in step S904, the respective motion vectors of the blocks in each of the area units of the first frame to be estimated 702 are generated according to the assignation result of step S902.

After that, in step S906, the predetermined motion vector values are respectively assigned to the corresponding area units in the second frame to be estimated 703 based on the respective assignation patterns of each of the area units in the first frame to be estimated 702. Further in step S908, respective motion vectors of the blocks in each of the area units of the second frame to be estimated 703 are generated according to the assignation result of step S906. It should be noted that in the embodiment, both the blocks in each of the area units of the first frame to be estimated 702 and the blocks in each of the area units of the second frame to be estimated 703 are assigned with the same predetermined motion vector values according to a rotation mapping relationship.

In addition, the motion estimation method of the second embodiment can refer to the enough instructions, suggestions and the implementation depictions in the above-mentioned exemplary embodiment of FIGS. 1-7, which is omitted to describe.

In summary, in the above-mentioned embodiments, by assigning every one of the predetermined motion vector values to at least one block in each area unit, it can be assured that motion vectors are generated with different directions in a fixed area or a variable area, which avoids the conventional result that motion vectors with some of directions are unable to get their turns to be generated. In comparison with the prior art, the embodiments can largely shorten the time required for convergence to accurate vectors. In addition, in each area unit, two adjacent blocks can be assigned with different motion vector values so as to further shorten the time for a motion object to converge to an accurate vector in a motion estimation.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A motion estimation method, adapted to a motion estimation device, the motion estimation method comprising:
    dividing a first frame to be estimated into a plurality of area units, wherein each of the area units comprises a plurality of blocks; and
    assigning a set of motion vector values to each of the area units, wherein the set of motion vector values comprises a plurality of predetermined motion vector values, and each of the predetermined motion vector values is assigned to at least one block in each of the area units,
    wherein each of the area units of the first frame to be estimated has one sub-area or multiple sub-areas, each of the sub-areas comprises one block or multiple blocks, and the one block or the multiple blocks of two corresponding sub-areas in any two area units are respectively assigned the same predetermined motion vector values with a rotation mapping relationship.

2. The motion estimation method as claimed in claim 1, wherein the predetermined motion vector values assigned to any two adjacent blocks in each of the area units are different from each other.

3. The motion estimation method as claimed in claim 1, wherein each of the area units has a variable total number of blocks.

4. The motion estimation method as claimed in claim 1, wherein each of the area units has a fixed total number of blocks.

5. The motion estimation method as claimed in claim 1, further comprising providing a lookup table for recording the predetermined motion vector values assigned respectively to the blocks of each area unit of the first frame to be estimated.

6. The motion estimation method as claimed in claim 5, further comprising generating a plurality of motion vectors respectively corresponding to the blocks of each of the area units of the first frame to be estimated referring to the lookup table.

7. The motion estimation method as claimed in claim 1, wherein the step of assigning the set of predetermined motion vector values to each of the area units comprises:
    providing a seed area unit, comprising a plurality of blocks to which the predetermined motion vector values are respectively assigned; and respectively assigning the predetermined motion vector values to the respective blocks of each of the area units based on an assignation pattern of the seed area unit.

8. The motion estimation method as claimed in claim 7, wherein the step of respectively assigning the predetermined motion vector values to the respective blocks of each of the area units based on the seed area unit comprises:

dividing the seed area unit into one first sub-area or multiple first sub-areas, wherein each of the first sub-areas comprises one block or multiple blocks;

dividing each of the area units into one second sub-area or multiple second sub-areas, wherein each of the second sub-areas comprises one block or multiple blocks, and the one block or the multiple blocks of each of the second sub-areas are corresponding to the one block or the multiple blocks of each of the one first sub-area or the multiple first sub-areas; and respectively deciding the assignation pattern for the corresponding one second sub-area or the corresponding multiple second sub-areas in each of the area units based on the respective assignation pattern of the one first sub-area or the multiple first sub-areas.

9. The motion estimation method as claimed in claim 8, wherein the respective one block or the respective multiple blocks of the one first sub-area or the multiple first sub-areas and the respective one block or the respective multiple blocks of the one second sub-area or the multiple second sub-areas in each of the area unit are respectively assigned the same predetermined motion vector values with a rotation mapping relationship.

10. The motion estimation method as claimed in claim 1, further comprising:

respectively assigning the predetermined motion vector values to the corresponding area unit in a second frame to be estimated based on the respective assignation pattern of each of the area units in the first frame to be estimated.

11. The motion estimation method as claimed in claim 10, wherein the blocks of each of the area units of the first frame to be estimated and the blocks of each of the area units of the second frame to be estimated are assigned the same predetermined motion vector values with a rotation mapping relationship.

12. A motion estimation method, adapted to a motion estimation device, the motion estimation method comprising:

dividing a first frame to be estimated into a plurality of area units, wherein each of the area units comprises a plurality of blocks;

providing a seed area unit, comprising a plurality of blocks to which a plurality of predetermined motion vector values are respectively assigned;

respectively assigning the predetermined motion vector values to the respective blocks of each of the area units based on an assignation pattern of the seed area unit, wherein each of the predetermined motion vector values is assigned to at least one block in each of the area units, and the predetermined motion vector values assigned to any two adjacent blocks in each of the area units are different from each other, wherein the step of respectively assigning the predetermined motion vector values to the respective blocks of each of the area units based on the seed area unit comprises:

dividing the seed area unit into one first sub-area or multiple first sub-areas, wherein each of the first sub-areas comprises one block or multiple blocks;

dividing each of the area units into one second sub-area or multiple second sub-areas, wherein each of the second sub-areas comprises one block or multiple blocks, and the one block or the multiple blocks of each of the second sub-areas are corresponding to the one block or the multiple blocks of each of the one first sub-area or the multiple first sub-areas; and respectively deciding the assignation pattern for the corresponding one second sub-area or the corresponding multiple second sub-areas in each of the area units based on the respective assignation pattern of the one first sub-area or the multiple first sub-areas.

13. The motion estimation method as claimed in claim 12, wherein the respective one block or the respective multiple blocks of the one first sub-area or the multiple first sub-areas and the respective one block or the respective multiple blocks of the one second sub-area or the multiple second sub-areas in each of the area unit are respectively assigned the same predetermined motion vector values with a rotation mapping relationship.

14. The motion estimation method as claimed in claim 12, further comprising:

respectively assigning the predetermined motion vector values to the corresponding area unit in a second frame to be estimated based on the respective assignation pattern of each of the area units in the first frame to be estimated.

* * * * *